May 25, 1954     I. N. PALLEY     2,679,369
SELF-ALIGNING MOUNT

Filed Feb. 23, 1951     6 Sheets-Sheet 1

INVENTOR.
I. Nevin Palley
BY
Attorney

INVENTOR.
I. Nevin Palley
Attorney

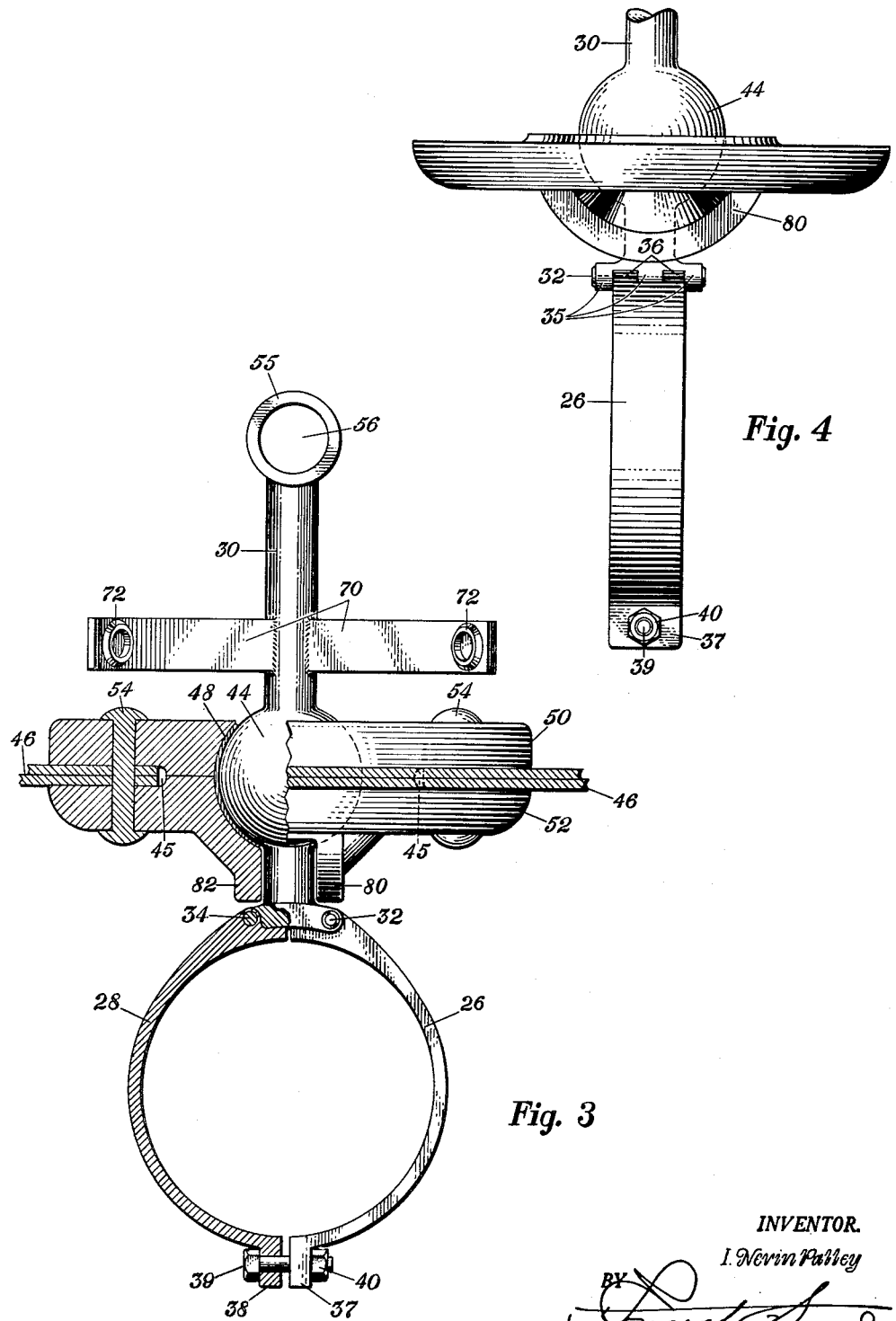

May 25, 1954 — I. N. PALLEY — 2,679,369
SELF-ALIGNING MOUNT
Filed Feb. 23, 1951 — 6 Sheets-Sheet 4

INVENTOR.
I. Nevin Palley

May 25, 1954  I. N. PALLEY  2,679,369
SELF-ALIGNING MOUNT

Filed Feb. 23, 1951  6 Sheets-Sheet 5

INVENTOR.
I. Nevin Palley
BY
Attorney

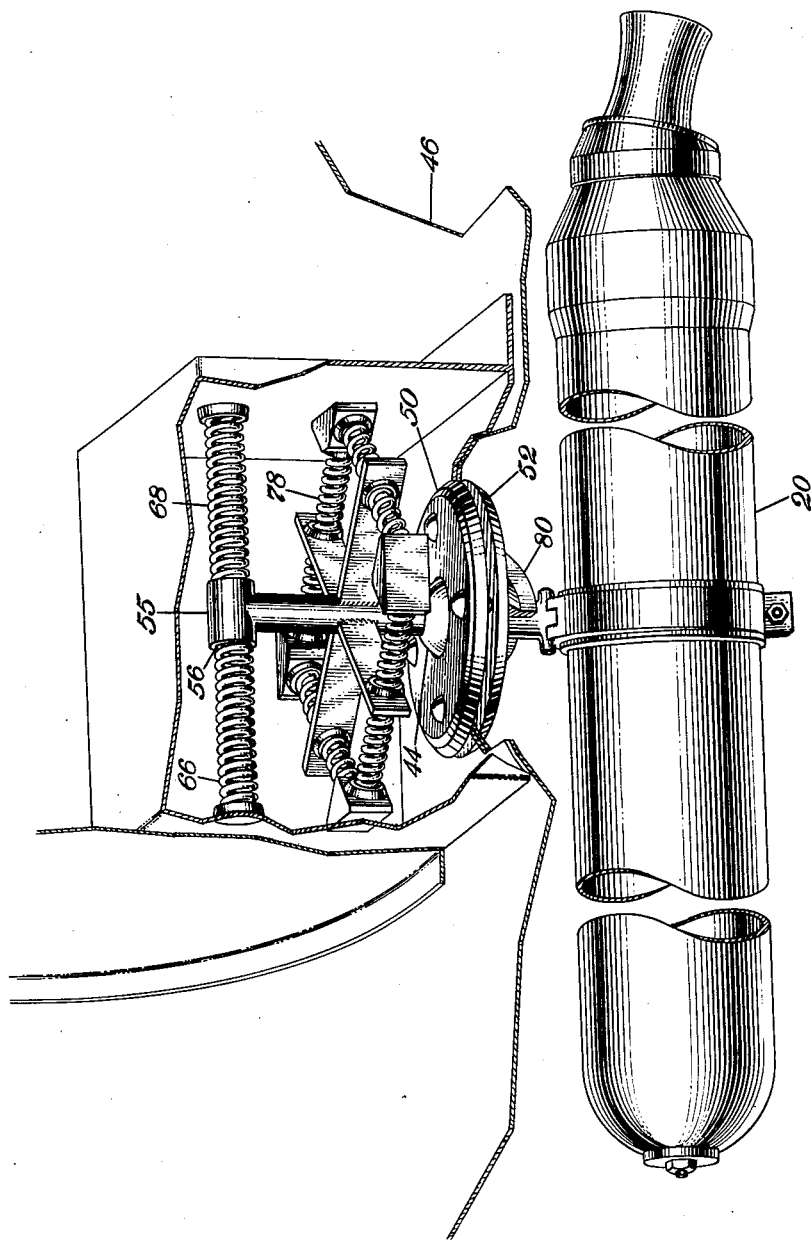

Patented May 25, 1954

2,679,369

UNITED STATES PATENT OFFICE 2,679,369

SELF-ALIGNING MOUNT

I. Nevin Palley, Lancaster, Calif., assignor, by mesne assignments, to Chance Vought Aircraft, Incorporated, a corporation of Delaware Application February 23, 1951, Serial No. 212,456

5 Claims. (Cl. 248—5)

This invention relates to self-aligning mounts and particularly to the mounting of rocket motors on aircraft.

Present day aircraft have been developed to a point where they are capable of flying long distances with heavy loads and, as the weight of fuel necessary for long flights is great, difficulty is often encountered in getting an airplane into the air when it is fully loaded with cargo and fuel. One expedient used to assist aircraft in becoming airborne and attaining sufficient speed and altitude for normal flight is to have a rocket booster motor secured to the wings or fuselage of the aircraft. The type of rocket motors used for aiding aircraft in take-off has a tremendous amount of thrust for a very short period of time. Other type rocket motors are designed for use as auxiliaries to get an aircraft up to a high speed after the aircraft is airborne so that an engine can be efficiently utilized.

An airplane is propelled by the thrust of a propeller or a jet engine and the directional path of this thrust will hereinafter be termed the line of thrust of the airplane. The directional path of the thrust of a rocket motor will hereinafter be termed the line of thrust of the rocket. When an airplane uses an auxiliary rocket motor, the relative alignment of the line of thrust of the rocket with the line of thrust of the airplane is of critical importance, particularly at take-off speeds, and must be determined very carefully and accurately. If only one rocket motor is used for auxiliary power on an aircraft, the rocket would be preferably mounted on the aircraft directly under the longitudinal axis of the aircraft and parallel thereto and in such a position that the line of thrust of the rocket would pass through the center of gravity of the airplane. If two or more rockets are used, they would be mounted equi-distant from the longitudinal axis of the aircraft and with equal angularity thereto in order that the rocket thrust would be applied equally to the aircraft by each rocket in order to prevent unstable forces acting on the airplane. For convenience in the present illustration the precise positioning of the rocket motor will be termed the alignment of the rocket motor with the aircraft and in some cases it will be termed the alignment of the line of thrust of the rocket motor to the line of thrust of the airplane. Usually the line of thrust of the rocket is directed by its exhaust nozzle through the center of gravity of the airplane. When this relationship between the two lines of thrust has been evolved for a particular aircraft using a rocket motor of definite thrust and design, that relationship or alignment should be maintained and any tendency for the rocket motor to deviate from this established alignment must be prevented or counteracted. Control surfaces and other structure in aircraft are normally designed to be used for the power loading of the craft itself exclusive of auxiliary power packages. Rocket motors which are used on aircraft provide great bursts of power considerably greater than the maximum power which the aircraft itself contains. Therefore, when an aircraft utilizes an auxiliary rocket motor, any slight deviation of the rocket's line of thrust from its determined relationship with the line of thrust of the airplane must be taken into consideration inasmuch as this deviation or misalignment might easily cause the aircraft to crash or to go astray of its determined path of flight. It has been found very difficult to prevent these misaligning tendencies and it has been concluded that automatic and quick realignment is the preferred method of counteracting these tendencies. A deviation from the determined relationship of the two lines of thrust, that is, a misalignment, may be caused by any of a variety of possible factors, for example, by the uneven burning of the rocket fuel or by mechanical misalignment caused by faulty installation of the rocket motor on the aircraft. In addition, the characteristics of rocket motors are not always uniform because of discrepancies in the manufacture of the motor, its attachments, or its propellant charge and these variations tend to produce rocket motor misalignment.

In accordance with this invention, the aforestated misalignment of the lines of thrust of the rocket motor and of the aircraft is minimized or corrected by mounting the rocket motor on the aircraft by means of a mounting bar which is rigidly attached to the rocket motor and rotatably attached to the aircraft. The bar, and consequently the rocket motor is held yieldably in a predetermined position by a plurality of counterpoised springs secured to the mounting bar and to the aircraft. Should the rocket motor become misaligned, the action of these springs on the bar cause it to assume a new position which will compensate for the misalignment and return the rocket line of thrust to its desired position.

It is an object of this invention to provide a mount for a rocket motor that will quickly restore the rocket motor's line of thrust to a predetermined relation between the lines of thrust of the rocket motor and of the airplane in the event of a misalignment thereof.

It is another object of this invention to provide a self-aligning rocket motor mount which will permit the rocket motor to temporarily pitch and yaw but prevent any rolling movements of the rocket motor.

A further object of this invention is to provide single point suspension for a rocket motor.

A still further object of this invention is to provide a mount which will facilitate the attaching or detaching of rocket motors.

A yet further object of this invention is to provide a self-aligning mount of simple construction and efficient operation.

Other objects and advantages will become evident to those skilled in the art from the specification and claims, and from the accompanying drawings which illustrate an embodiment of the invention.

In the accompanying drawings:

Fig. 3 is a front view of the mounting ring and bar of this invention drawn to a still larger scale and with a portion on the left hand side broken away;

Fig. 4 is a side view of the mounting ring and ball joint as shown in Fig. 3, the top portion thereof being broken away and parts deleted for clarity;

Fig. 9 is a perspective view, partly in section, showing the rocket motor attached to the realigning mount which is installed on the aircraft.

Figure 1:
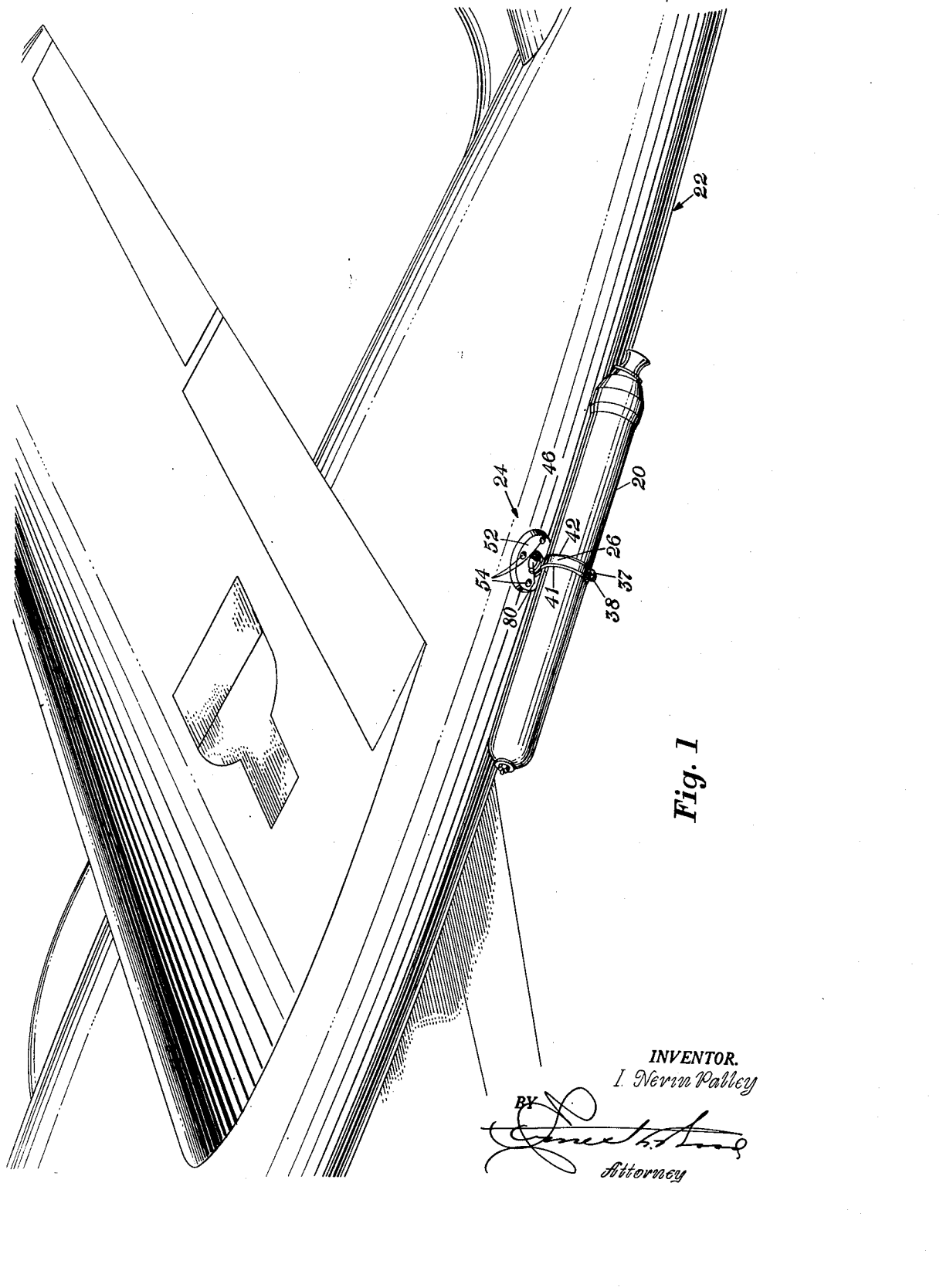
Fig. 1 is a perspective view of a rocket motor and the realigning mount of this invention attached to the belly of an aircraft.

Referring now to Fig. 1 of the drawings, the rocket motor 20 is shown rotatably secured to the fuselage of an aircraft 22 by means of the realigning mount 24. It will be understood that rocket motors may be attached to the aircraft at any number of structurally suitable points on the aircraft. The points of attachment of the rocket motors depend on the design of the aircraft and the thrust required of each rocket motor.

Figure 2:
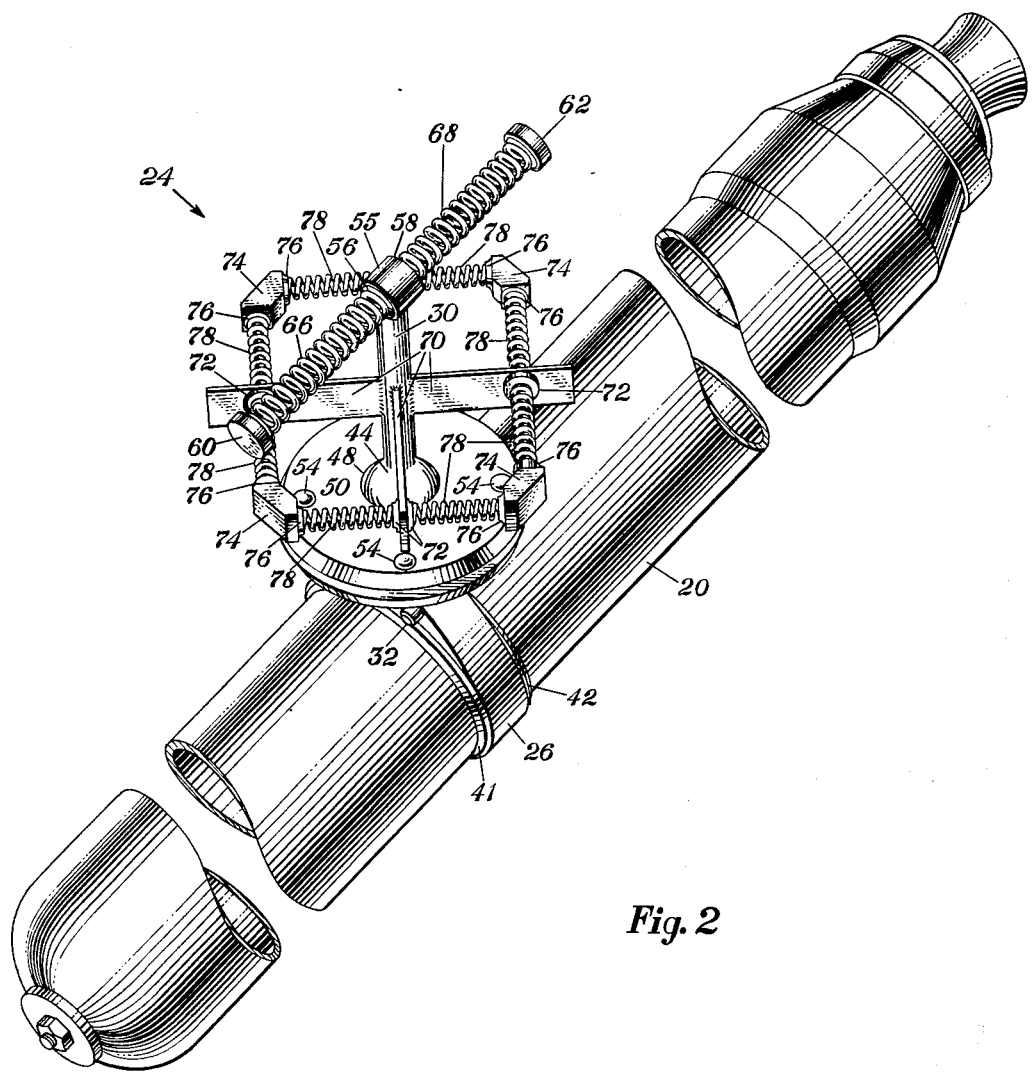
Fig. 2 is a perspective view drawn to a larger scale of the realigning mount of this invention to which a rocket motor is attached.

Referring now to Figs. 2, 3, and 4, two arcuate arms 26 and 28 are hingedly secured to the bar 30 of the mount 24 by rivets 32 and 34 which extend through registering apertures in parallel flanges 35 and 36 integral with the lower end of bar 30 and in the upper ends of arms 26 and 28. The lower ends of arms 26 and 28 terminate in downwardly depending legs 37 and 38, respectively, which are held together by bolt 39 and nut 40 so as to form a circular band which may be rigidly secured around the rocket motor at the rocket motor's center of gravity by tightening nut 40 on bolt 39.

The casing of rocket motor 20 is designed so as to provide two parallel annular flanges 41 and 42 disposed at opposite sides of its center of gravity and so arranged as to receive the arcuate arms 26 and 28 between them to prevent any fore or aft movement of the rocket motor relative to the clamping arms 26 and 28.

Intermediate its ends, bar 30 has a spherical or ball shaped portion 44 disposed in an aperture 45 in the skin 46 of the aircraft. The ball 44 is held in a ball socket 48 formed by plates 50 and 52 which are secured on opposite sides of the skin 46 by bolts or rivets 54. The rocket motor's thrust is transmitted to the aircraft through the ball 44 and its socket 48.

Figure 8:
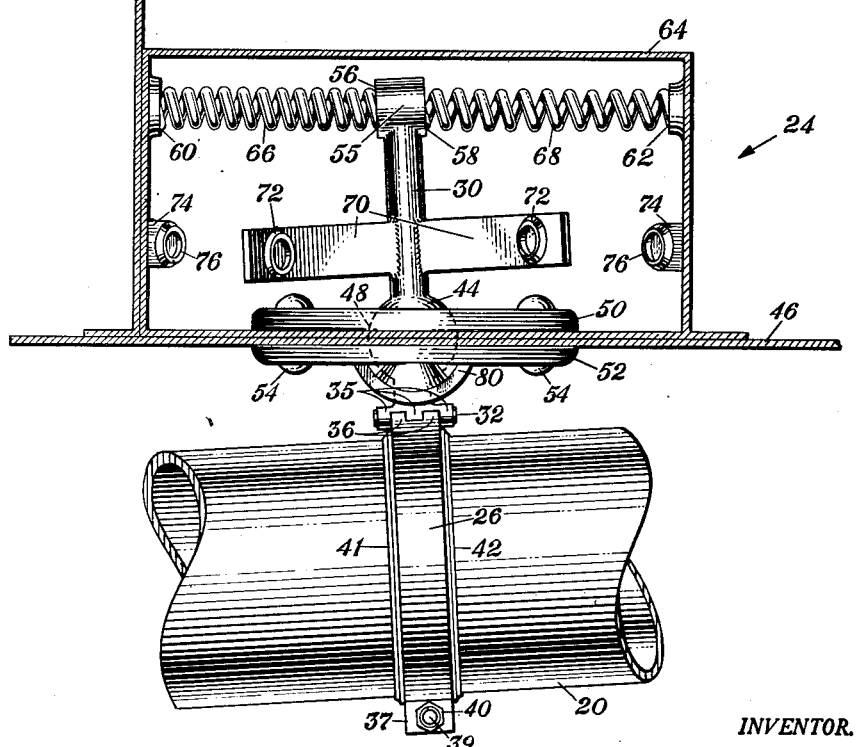
Fig. 8 is a side view of the mechanism shown in Fig. 7 with parts thereof deleted for clarity.

The end of bar 30 which extends into the aircraft is biased toward a position which causes the line of thrust of the rocket motor to be aligned with the line of thrust of the aircraft by an arrangement which will now be described. Bar 30 has at its inboard or upper end a cylindrical boss 55 integral therewith. The boss 55 is provided with two cup-shaped recesses 56 and 58 disposed on opposite sides of the boss 55. Similar recesses 60 and 62 are provided by suitable blocks rigidly secured to aircraft structure or suitable housing 64 as shown in Fig. 8. Two compression springs 66 and 68 have their ends rigidly secured in recesses 56 and 60 and 58 and 62, respectively, in a pre-loaded condition to urge bar 30 to its predetermined position. Springs 66 and 68 are parallel to the fore and aft centerline or pitch axis of the rocket. Integral with bar 30 and intermediate the ball 44 and the boss 55 are four flat flanges or projections 70 which lie in the same plane at right angles to each other, the projections being at a forty-five degree angle to the fore and aft centerline of the aircraft. Projections 70 each have two cups 72 welded to their free extremities on opposite sides thereof. Four blocks 74 are rigidly secured to the aircraft structure 64 attached, as by welding, at diametrically opposite points in the same plane as the projections 70 and intermediate the angles formed by the four projections 70. Each of the blocks 74 has two cup-shaped recesses 76, similar to the recesses formed by the cups 72 on the projections 70, which are disposed at right angles to each other. Each recess 76 faces a recess in a cup 72 and in each pair of these recesses the opposite ends of a helical compression spring 78 are rigidly secured. It can be seen therefore, that springs 78, which are located between the recesses 76 of blocks 74 and recesses 72 of projections 70, will provide a resilient restraining means for bar 30. This resilient restraint allows limited turning movements of the bar 30 caused by yawing of the rocket motor but continuously biases the mounting bar 30 toward its predetermined position. In summary, the perspective view of Fig. 2 shows the placement of the two springs 66 and 68, the four projections 70, the eight recesses 72, the four blocks 74, the eight recesses 76, and the eight springs 78 in respect to bar 30 and the rocket motor 24.

Figure 5:
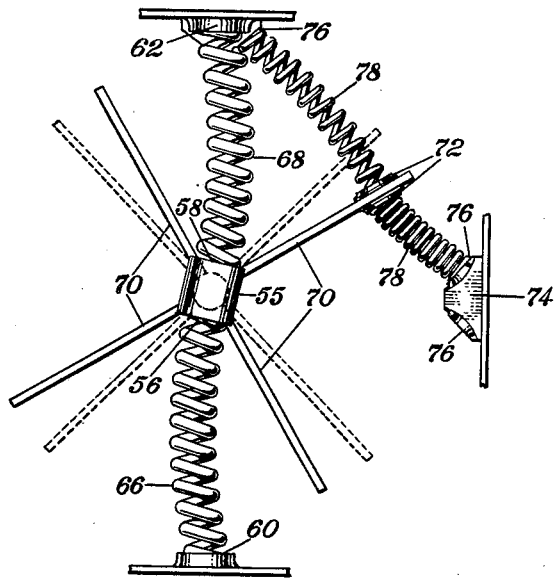
Fig. 5 is a top view of the self-aligning mechanism showing it temporarily misaligned in a horizontal plane with parts thereof deleted for clarity, the dotted lines outlining the normal positions of the projections.
Figure 6:
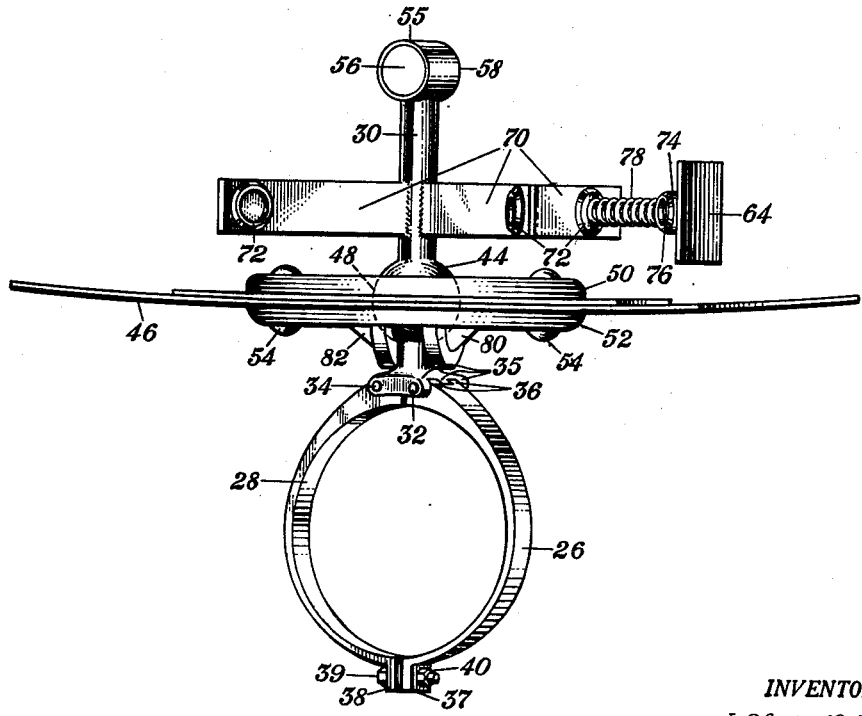
Fig. 6 is a side view of the mechanism shown in Fig. 5 with parts thereof deleted for clarity.

It is desired to prevent any rolling of the rocket. To that end, flanges 80 and 82 (Fig. 3) depend from plate 52 on either side of bar 30 below ball 44 with close tolerances provided between the bar and the flanges. These flanges run in vertical planes parallel to the rocket motor's line of thrust and are designed so as to prevent any rolling motion of the rocket motor. Figs. 5 and 6 show a condition of the mount where the rocket (not shown) has become misaligned in a horizontal plane from its predetermined position, that is, by yawing moments. If this misalignment is allowed to continue, the line of flight of the aircraft will be changed. Before the flight attitude of the aircraft can change, however, four of the eight springs 78, which have been further compressed, and springs 66 and 68, which have been distorted, exert force on the projections 70 which bias the bar 30 toward its predetermined position and consequently tend to counteract the forces causing the yawing moments.

Figure 7:
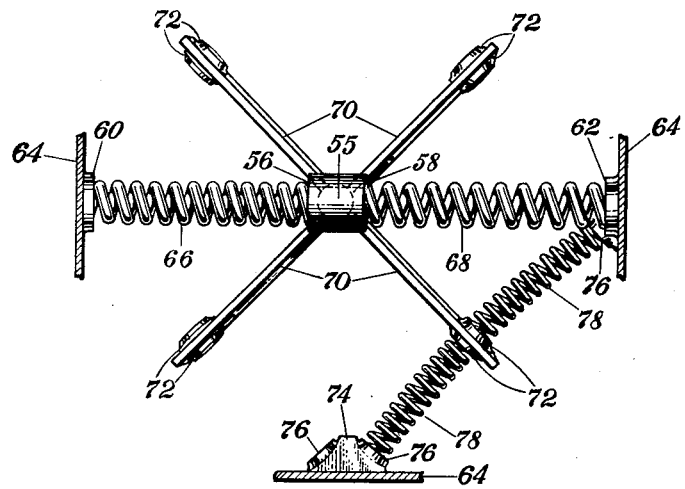
Fig. 7 is a top view of the self-aligning mechanism showing it temporarily misaligned in a vertical plane with parts thereof deleted for clarity.

Figs 7 and 8 show a condition of the mount where the rocket alignment has been destroyed and the rocket is misaligned vertically, that is, by pitching moments. The spring 66 or 68, whichever is caused to be in greater compression by the pitching, and springs 78, which have been distorted, exert force on bar 30 which is thereby biased toward its predetermined position. The pitching moments consequently tend to be counteracted. As aforementioned, no rolling movements are permitted by the flanges 80 and 82.

While only one embodiment of the invention has been shown in the accompanying drawings, it will be evident that various modifications are possible in the arrangement and construction of the self-aligning mount's components without departing from the scope of the invention.

What is claimed and desired to be secured by Letters Patent is:

1. In combination: a relatively fixed structure having an exterior and having an interior portion, a body having a longitudinal axis, and a support mechanism supporting said body on said fixed structure exteriorly thereof adapted to return said body to a predetermined neutral position after pitching or yawing movement of the same with respect to said fixed structure comprising; a bar member having a longitudinal axis and extending through said fixed structure having one of its ends extending into the interior of said fixed structure and the other of its ends disposed exteriorly of said fixed structure, said bar member having a mid-portion and a ball portion integral with said mid-portion; socket means mounted on said fixed structure and supporting said ball portion and cooperating therewith to form a universal joint; means for rigidly connecting said body to said other end of said bar member; flanges having free ends extending radially from said bar member intermediate said ball portion and said one end of said bar member; a pair of biasing members disposed parallel to the longitudinal axis of said body on opposite sides of said one end of said bar member and having an operative connection therewith and having an operative connection to the interior of said fixed structure adapted to yieldably urge said member to a predetermined neutral position after displacement in pitch of said body in relation to said fixed structure; a pair of resilient members in opposed relationship on opposed sides of and connected to the free end of each of said flanges and having an operative connection to the interior portion of said fixed structure perpendicular to a plane containing said flange and the longitudinal axis of said bar member adapted to yieldably rotate said bar member about its longitudinal axis to a predetermined neutral position after rotational displacement in yaw of said body from its predetermined neutral position with respect to said fixed structure; and restraining means for preventing lateral bodily movement of said body including a pair of depending lugs secured to said fixed structure, said lugs being adjacent to and on either side of the exterior end of said bar member.

2. In combination: a relatively fixed structure having an exterior and having an interior portion, a body having a longitudinal axis, and a support mechanism supporting said body on said fixed structure exteriorly thereof in a predetermined dependent position relative to said fixed structure and adapted to return said body to said predetermined position relative to said fixed structure after pitching and yawing movement of the body comprising; a member having one of its ends extending into the interior of said fixed structure and having its other end disposed exteriorly of said fixed structure and adapted to have a predetermined neutral position when said body is in its predetermined position; a ball portion on said member intermediate said ends; socket means mounted on said fixed structure and supporting said ball portion and cooperating therewith to form a universal joint; means for rigidly connecting said body to said external end of said member; a pair of resilient means disposed parallel to the longitudinal axis of said body in its predetermined position in opposed relationship on opposite sides of and connected to the internal end of said member and having an operative connection with the interior of said fixed structure for urging said member to resume its predetermined position after pitching movement of said body; projections having free ends extending radially from said member intermediate said internal end and said ball portion and angularly of said longitudinal axis; and a pair of resilient members in opposed relationship on opposite sides of and connected to the free end of each of said projections and having an operative connection to the interior of said fixed structure, said resilient members being disposed on a plane parallel to the longitudinal axis of said body in its predetermined position and adapted to rotationally urge said member toward its predetermined position after yawing movement of said body.

3. In combination: a relatively fixed structure having external and internal portions, a body having a longitudinal axis, and a support mechanism supporting the external portion of said body on said fixed structure in a predetermined position relative to said fixed structure and adapted to return said body to its predetermined position after pitching or yawing movement of the same relative to said fixed structure comprising; a member having a longitudinal axis and having one of its ends extending into the internal portion of said fixed structure and having its other end disposed externally of said fixed structure and adapted to have a predetermined position when said body is in its predetermined position, said member having a ball portion intermediate said ends; socket means mounted on said fixed structure and supporting said ball portion and cooperating with said ball portion to form a universal joint; means for connecting said body to said external end of said member, said means comprising a pair of opposed curved arms having a rigid connection to the external end of said member, each of said arms having one end pivotally secured to said member and fitting around said body and having its other end releasably secured to the other end of the other arm; a pair of resilient means disposed in opposed relationship parallel to the longitudinal axis of said body in its predetermined position on either side of and connected to the internal end of said member and having an operating connection to the internal portion of said fixed structure for realigning said member in its predetermined position after pitching movement of said body; projections fixedly attached to said member and having free ends extending radially from said member intermediate said internal end and said ball portion and angularly of said longitudinal axis; and pairs of resilient members disposed in opposed relationship on either side of and connected to the free ends of said projections and having operative connections to said fixed structure, said pairs of resilient members adapted to exert forces normal to and on said projections for urging said member to its pretermined position by rotating said member about its longitudinal axis when said body is displaced in yaw from its predetermined position.

4. In combination: a relatively fixed structure having internal and external portions, a body having a longitudinal axis, and a support mechanism supporting said body on said fixed structure in a predetermined position relative to said fixed structure and adapted to return said body to its predetermined position after pitching and yawing movement of the same relative to said fixed structure comprising; a bar member having a longitudinal axis and having one of its ends extending internally of said fixed structure and having its other end disposed externally of said fixed structure having a neutral position corresponding to the predetermined position of said body, said bar member having a ballportion in its midportion; socket means mounted on said fixed structure and supporting said ball portion and cooperating therewith to form a universal joint; means for rigidly connecting said body to said external end of said bar member; a pair of opposed compression springs disposed in opposed relationship parallel to the longitudinal axis of said body one on either side of said bar member and having operative connections to the internal portion of said fixed structure and to the internal end of said bar member to realign said body in its predetermined position after pitching movement of said body; four projections having free ends extending horizontally and radially from said bar member intermediate said internal end and said ball portion at equal angles from the longitudinal axis of said body; and four pairs of opposed compression members disposed in a horizontal plane parallel to the longitudinal axis of said body and angularly thereto, one of said compression members being on each side of the free end of each of said projections between the free end of said each projection and the internal portion of said fixed structure and having operative connections to the free ends of said projections and the internal portion of said fixed structure, each of said compression members being positioned at a right angle to the projection to which it is connected for rotating said bar member about its longitudinal axis to realign said body in its predetermined position after yawing movement of said body.

5. In combination: a relatively fixed structure having exterior and interior portions and having an aperture communicating therebetween, a body having a longitudinal axis, and a support attaching said body to said fixed structure, said body being attached in a yieldably predetermined neutral position relative to said fixed structure, said support being adapted to return said body to its predetermined neutral position after pitching and yawing movements of the same with respect to said fixed structure, comprising; an elongate member having a longitudinal axis and an inner end extending through said aperture into the interior portion of said fixed structure, a mid-portion comprising a substantially spherically shaped body, and an outer end extending exteriorly of said fixed structure, said elongate member being adapted to have a predetermined neutral position; means for rigidly securing said body to said outer end of said elongate member; socket means mounted on said fixed structure for movably supporting said spherically shaped body to allow limited universal movement of said elongate member; resilient means extending parallel to the longitudinal axis of said body attached to and between said fixed structure and said inner end of said elongate member on opposed sides of the inner end of said elongate member adapted to urge said member to realign in its predetermined neutral position after pitching of said body; a plurality of projections extending radially from said elongate member intermediate said inner end and said midportion, said projections having free ends extending perpendicularly from said elongate member; and a plurality of pairs of resilient members, each of said pairs of resilient members being disposed angularly of said longitudinal axis and lying in a plane perpendicular to said elongate member, and having one pair of said pairs of resilient members operatively associated with each of said projections, one resilient member of a pair of resilient members being disposed between one side of the free end of one of said projections and the interior portion of said fixed structure and the other resilient member being disposed between the opposite side of said free end of said one of said projections and the interior portion of said fixed structures in opposed relationship to said one resilient member, said resilient members having operative connections with said interior of said fixed structure and the free ends of said projections and being positioned at right angles to said projections for exerting opposing forces on said projections to rotate said elongate member about its longitudinal axis toward its predetermined neutral position after yawing movement of said body.

References Cited in the file of this patent

UNITED STATES PATENTS

| Number | Name | Date |
|---|---|---|
| 1,560,572 | Hatton | Nov. 10, 1925 |
| 1,890,696 | Rosenhahn | Dec. 13, 1932 |
| 1,911,636 | Meitzler | May 30, 1933 |